United States Patent [19]

Suzuki et al.

[11] Patent Number: 4,566,417
[45] Date of Patent: Jan. 28, 1986

[54] FUEL INJECTION CONTROL APPARATUS FOR DIESEL ENGINES

[75] Inventors: Yutaka Suzuki, Nishio; Nobuhito Hobo, Inuyama; Yoshihiko Tsuzuki, Toyota; Takashi Naito, Oubu; Mikio Kumano, Anjo; Tetsuya Nakamura; Satoshi Haseda, both of Kariya; Akira Masuda, Chita, all of Japan

[73] Assignee: Nippondenso Co., Ltd., Kariya, Japan

[21] Appl. No.: 598,593

[22] Filed: Apr. 10, 1984

[30] Foreign Application Priority Data

Apr. 18, 1983 [JP] Japan .................................. 58-68030

[51] Int. Cl.⁴ ............................................... F02D 5/02
[52] U.S. Cl. .................................. 123/478; 123/480; 123/357
[58] Field of Search ............... 123/478, 480, 486, 494, 123/357

[56] References Cited

U.S. PATENT DOCUMENTS 3,724,436 4/1973 Nagata et al. ..................... 123/478
3,742,918 7/1973 Martin et al. ....................... 123/494
4,359,032 11/1982 Ohie ..................................... 123/478
4,426,981 1/1984 Greiner et al. ..................... 123/494
4,438,496 3/1984 Ohie ..................................... 123/478

Primary Examiner—Andrew M. Dolinar
Attorney, Agent, or Firm—Cushman, Darby & Cushman

[57] ABSTRACT

A fuel injection arrangement for a diesel engine. An overflow passage for high pressure fuel is provided in the engine's fuel injection pump. A solenoid valve is disposed in the overflow passage for controlling the fuel injection amount through its on-off operation. The time when the fuel injection pump starts injecting fuel is detected by an injection start detector. To this injection starting time point is added a target injection period to determine an injection end time. At this injection end time the solenoid valve is opened to discontinue the fuel injection. The target injection period is determined according to operating conditions of the engine. Since this apparatus detects the actual injection start point and controls the injection period on the basis of the result of the detection, the fuel injection amount can be controlled extremely accurately.

5 Claims, 17 Drawing Figures

FUEL INJECTION CONTROL APPARATUS FOR DIESEL ENGINES

BACKGROUND OF THE INVENTION

1. Field of the Invention

The present invention relates to a fuel injection control apparatus for a diesel engine in which the fuel injection amount of a fuel injection pump thereof is controlled by an electrical control circuit.

2. Description of the Prior Art

Heretofore, as well known, the injection amount of a fuel injection pump has been controlled in such a manner that a ring member for opening and closing a fuel overflow port is moved in the axial direction of a plunger by means of a mechanical governor which is operated by virtue of a centrifugal force of a flyweight or the like, to change the effective pressure stroke of the plunger.

Recently, also in such type of diesel engine, a well controllable fuel injection pump utilizing an electronic control has been developed in an attempt to improve fuel economy and the purification of exhaust gas. However, in order to directly follow the above conventional construction and control the position of the ring member accurately, it is necessary to use a highly accurate actuator and position sensor, thus inevitably resulting in a complicated construction and an increased cost.

In Japanese Patent Publication No. 39854/1972, there is disclosed an arrangement wherein the fuel injection amount is controlled not by a ring member of a fuel injection pump but by a solenoid valve disposed in an intermediate position of a high pressure passage which provides communication between a fuel pressurizing chamber and an injection nozzle. The solenoid valve is opened to inject fuel at an appropriate time point during the period during which a fuel pressurizing pump (plunger pump) pressurizes fuel, and it is closed at an appropriate time point to stop the fuel injection. For the crank shaft of an engine, the injection time point is controlled by the injection start timing and the injection amount is controlled by the period until the stopping of injection. However, in the application of such control unit to vehicles, a wide variable range of fuel injection amount is required from the aspects of exhaust gas, fuel consumption and driving performance, and in order to cover the entire range, it is necessary to prolong the fuel pressurizing period. In the case of a plunger pump, prolongation of the pressure stroke is unavoidable. But, if the pressure stroke of the plunger pump is made long, a restriction is placed on a cam mechanism which is for changing a rotational motion into a linear motion, thus causing problems such as, for example, an abnormal lift of the plunger at a high revolution and a deficiency in mechanical strength.

SUMMARY OF THE INVENTION

The present invention has been accomplished in view of the above-mentioned problems, and it is the object thereof to provide a control apparatus capable of controlling the fuel injection amount extremely accurately and promptly over the entire region of operating conditions of a vehicular diesel engine by using an overflow controlling solenoid valve.

The point of construction of this control apparatus resides in that a solenoid valve is disposed in an overflow passage of an injection pump for diesel engine for opening and closing the passage and in that there is used an injection start detector for electrically detecting the fuel injection starting time point of the said pump. The solenoid valve is controlled by a control circuit including a microcomputer which is operated in accordance with signals provided from the injection start detector and an operating conditions detector.

DESCRIPTION OF THE PREFERRED EMBODIMENTS

Embodiments of the present invention will be described hereinunder with reference to the accompanying drawings.

Figure 1:
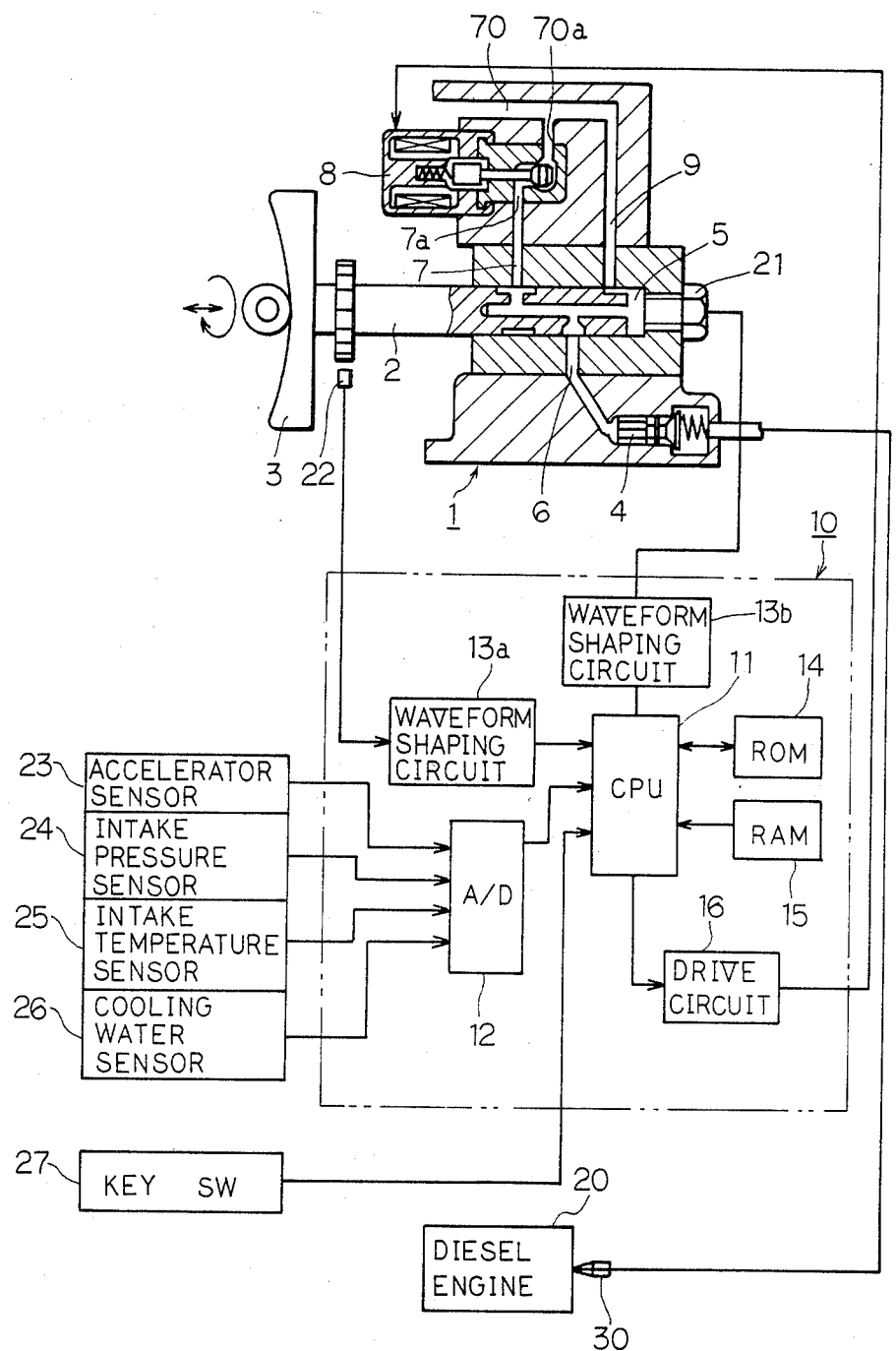
FIG. 1 is a block diagram illustrating an embodiment of the present invention.

Referring first to FIG. 1, there is shown a construction including a partial section of an injection pump in which the present invention is applied to a face cam distributor type injection pump 1 for a known diesel engine 20. The pump 1 is of the type in which fuel is introduced from a suction port 9 by means of a plunger 2 which is rotated and reciprocated through a face cam 3, then pressurized in a pump chamber 5 which serves as a pressurizing chamber, and then fed under pressure from a distribution port 6 to a fuel injection nozzle 30 through a retraction valve 4. In the present invention, in addition to the construction just described, a solenoid valve 8 is disposed at one end of an overflow passage (also known as an overflow port or a spill passage) 7 on which is exerted the pressure of the pump chamber 5 and which is normally in communication with the same chamber so that when the solenoid valve 8 is opened a high pressure fuel in the pump chamber 5 overflows into a low-pressure housing 70. The on-off operation of the solenoid valve 8 is controlled by a control circuit 10.

The reference numeral 21 denotes an injection pressure sensor as an injection start sensor for detecting the pressure in the pump chamber 5. Various operating conditions detectors are provided, including: a number of revolution sensor 22, an accelerator sensor 23 for detecting the amount of operation of an accelerator, an intake pressure sensor 24 for detecting the intake pressure, an intake temperature sensor 25 for detecting the intake temperature, a cooling water sensor 26 for detecting the temperature of engine cooling water, and a key switch 27.

Figure 2:
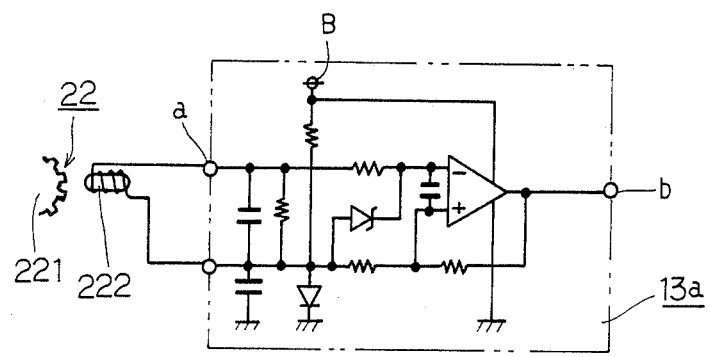
FIG. 2 is an electrical circuit diagram of a number of revolution sensor and a waveform shaping circuit both shown in FIG. 1.
Figure 3:
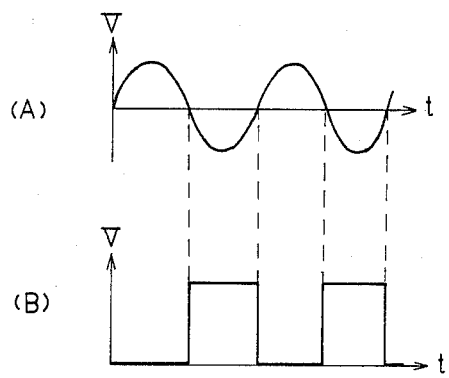
FIG. 3 input/output waveform diagram of the circuit shown in FIG. 2.

The number of revolution sensor 22 is for detecting the number of revolutions of the plunger 2 of the fuel injection pump 1, and its construction is as shown at the left-hand portion of FIG. 2. More specifically, the number of revolution sensor 22 is provided with a gear 221 connected directly to the plunger 2 having the same number of revolutions as that of a drive shaft, and an electromagnetic pickup 222 in which the voltage waveform at point "a" in FIG. 2 generates such AC voltage signal as shown in FIG. 3(A) according to flux variations induced by the rotation of the gear 221. The AC voltage signal output of the number of revolution sensor 22 is subjected to waveform shaping in a waveform shaping circuit 13a having such an electric circuit configuration as shown at the right-hand portion of FIG. 2. Then, the voltage waveform at point "b" in FIG. 2, namely, such a pulse voltage signal as shown in FIG. 3(B), is fed to a central processing unit (CPU) 11.

Figure 4:
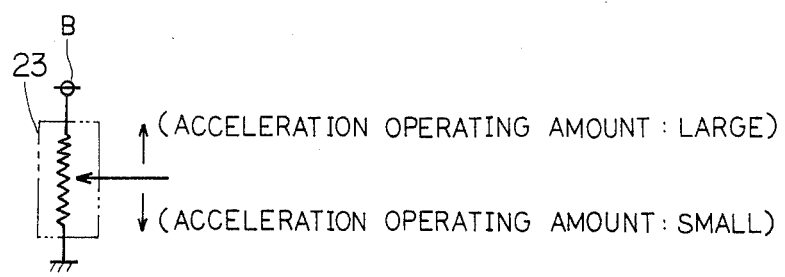
FIG. 4 is a circuit configuration diagram of an accelerator sensor shown in FIG. 1.

The accelerator sensor 23, as shown in FIG. 4, outputs an analog voltage signal proportional to the amount of operation of the accelerator by using a potentiometer. This output signal is converted to a digital signal by an analog-digital conversion circuit 12, which digital signal is fed to the CPU 11.

Figure 5:
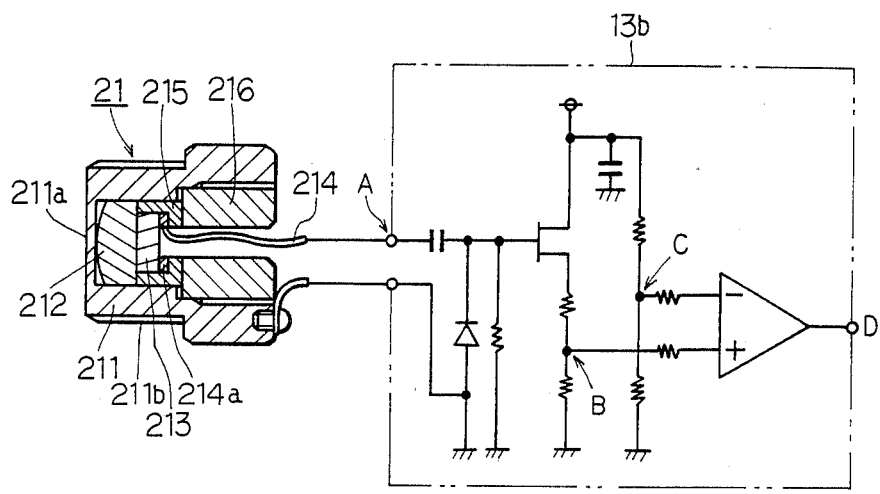
FIG. 5 is a block diagram of an injection pressure sensor and the waveform shaping circuit both shown in FIG. 1.
Figure 6:
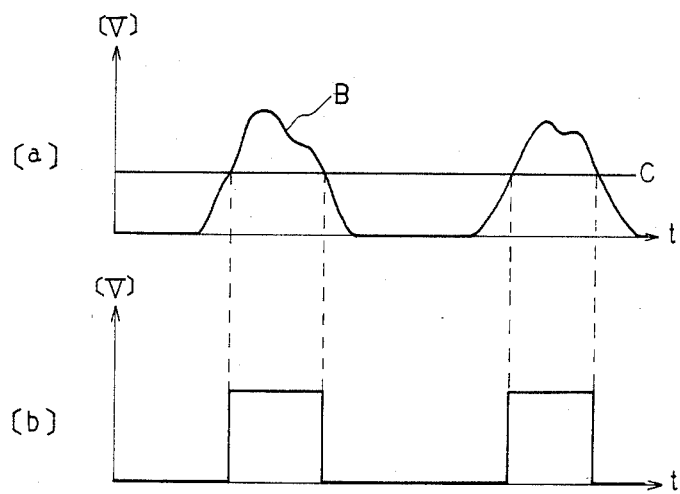
FIG. 6 input/output waveform diagram of the circuit of FIG. 5.

The injection pressure sensor 21 is for detecting the pressure in the pump chamber 5, and its construction is as shown at the left-hand portion of FIG. 5. More specifically the injection pressor sensor 21 is threadedly secured to the pump 1 through a screw portion 211b of a housing 211, and a pressure receiving portion 211a is provided in a position where the injection pressure of the pump chamber 5 is applied thereto. A piston 212 transmits the pressure exerted on the pressure receiving portion 211a to a piezo-electric element 213. The numeral 214a denotes a copper washer for drawing out the generated voltage from the piezo-electric element 213 to a lead wire 214. The numeral 215 denotes a spacer which comprises an insulator. The numeral 216 denotes a holder, which bears the force induced by the injection pressure to maintain the piezo-electric element 213 in a stationary state. An injection pressure signal, which is produced in the pump chamber 5 upon injection of fuel, generates such a waveform as B shown in FIG. 6 at point B in a waveform shaping circuit 13b shown at the right-hand portion of FIG. 5, and when a preset value of injection pressure (voltage at point C) corresponding to the valve opening pressure of the injection nozzle 30 is reached, there is produced such a pulse voltage signal as shown in line (b) of FIG. 6, which is fed to the CPU 11.

Figure 7:
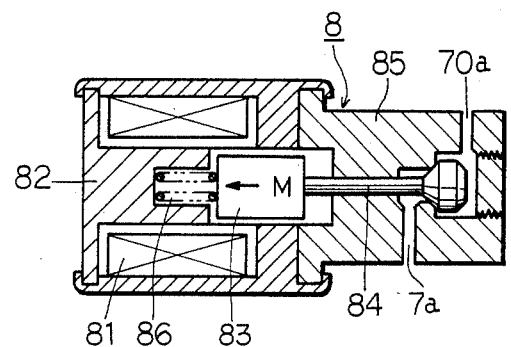
FIG. 7 is a sectional view of a solenoid valve.

The solenoid valve 8, which is constructed as shown in FIG. 7, comprises a core 82 which forms a magnetic circuit while holding a coil 81; a moving core 83 as a movable part; a needle 84 connected directly to the moving core 83; a nozzle body 85 having a port 7a which communicates with the overflow port 7 and also having a passage 70a to the low-pressure chamber of the pump; and a return spring 86. When the coil 81 is energized, the moving core 83 and the needle 84 move in the direction of arrow M against the biasing force of the return spring 86, so that the port 7a and the passage 70a are intercepted (the state of FIG. 7). On the other hand, when the coil 81 is deenergized, the port 7a and the passage 70a come into communication with each other.

The control circuit 10, as shown in FIG. 1, is composed of the CPU 11, the waveform shaping circuits 13a and 13b, the analog-digital conversion circuit 12, a read-only memory (ROM) 14, a random access memory (RAM) 15, and a drive circuit 16 for amplifying the power of the signal from the CPU 11 and driving the solenoid valve 8.

Figure 8:
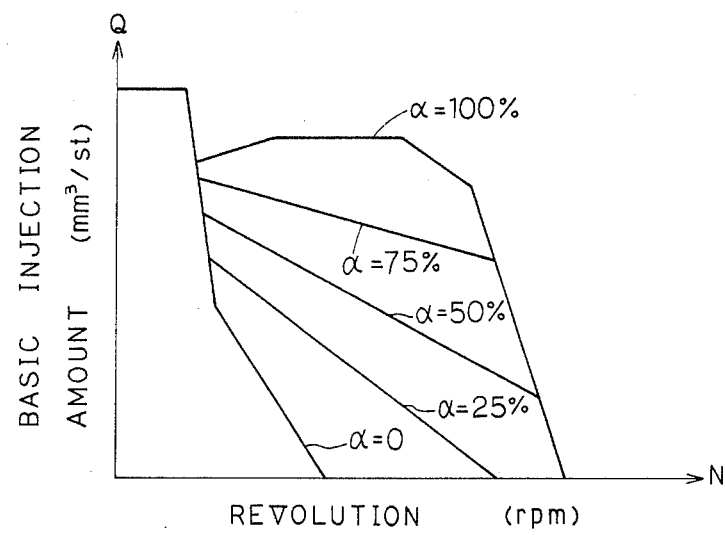
FIG. 8 is a characteristic diagram showing a basic injection amount pattern.
Figure 9:
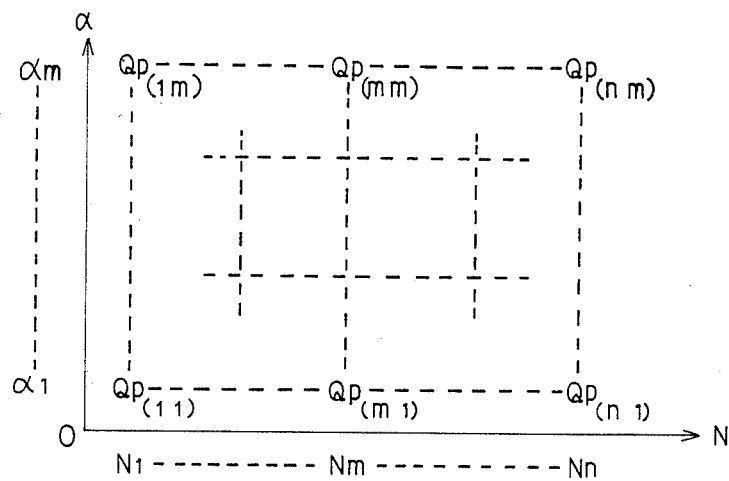
FIGS. 9, 10 and 15 are views for explaining maps stored in a ROM shown in FIG. 1.
Figure 10:
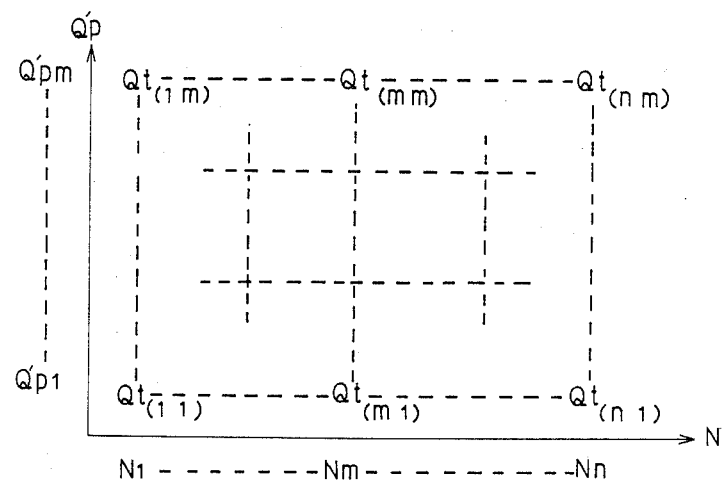
Figure 11:
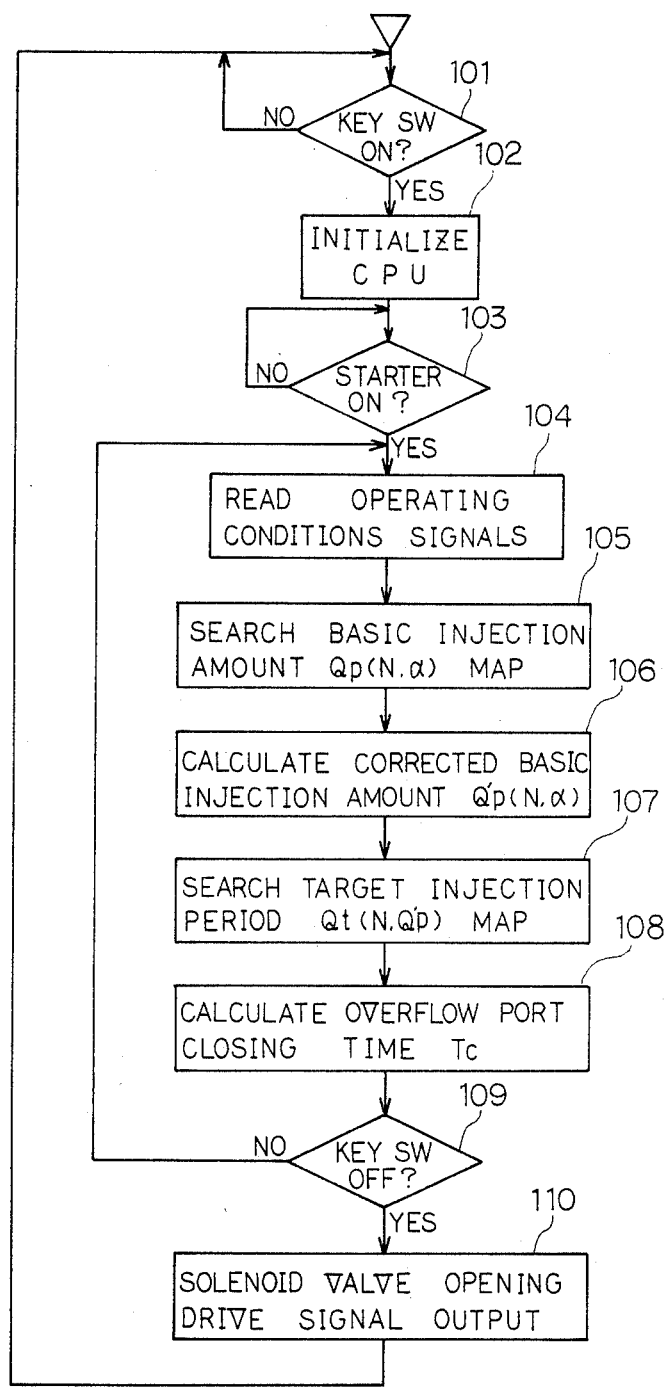
FIGS. 11, 12, 13 and 14 are flowcharts showing processing procedures in a control circuit shown in FIG. 1.

In the ROM 14 is stored in advance a program for the execution of processings. Also, basic injection amount data corresponding to such injection amount characteristic governor pattern as shown in FIG. 8 are beforehand stored in the ROM 14 as such a two-dimensional map as shown in FIG. 9, namely, as a basic injection amount map (memory pattern) which stores basic injection amount Qp (N, α) data corresponding to the address designated by both N data on the number of revolutions of the plunger 2 and data on the amount of operation of the accelerator. Further stored in the ROM 14 is a memory pattern which stored target injection period Qt (N, Q'p) corresponding to the address designated by both the number of revolutions N and corrected basic injection amount Q'p obtained by correcting basic injection amount Qp as explained below as shown in FIG. 10.

The operation of the present invention will be described below with reference to the flowcharts of FIG. 11 to 14. The CPU 11 repeatedly performs such a series of processings as illustrated in the main routine of FIG. 1 in accordance with the program stored in the ROM 14.

First, in step 101, whether the key switch 27 is ON or not is judged on the basis of a signal provided from the key switch 27, and if the result of the judgement is "YES", the CPU 11 is initialized in step 102. Then, in step 103, whether the key switch 27 is in the starter position or not is judged on the basis of a signal from the key switch. If the result of this judgement is "YES", then signals provided from the operating conditions detectors 22-27 are drawn in. Then, in step 105, the basic injection amount map (governor pattern) in the ROM 14 is searched. This pattern search is performed on the basis of the number of revolutions N and the amount of operation of the accelerator α which were input in step 104, and the corresponding basic injection amount Qp (N, α) data is transferred into the CPU 11.

Next, in step 106 there is performed a processing for correcting the thus-transferred basic injection amount Qp (N, α) and calculating a corrected basic injection amount Q'p (N, α). More specifically, the basic injection amount Qp (N, α) is corrected on the basis of the following data which were input in step 104—intake pressure data from the intake pressure sensor 24, intake temperature data from the intake temperature sensor 25 and cooling water temperature data from the cooling water temperature sensor 26—and the corrected basic injection amount Q'p (N, α) is calculated.

In step 107, the two-dimensional map in the ROM 14 is searched. This pattern search is performed on the basis of the number of revolution N which was input in step 104 and the corrected basic injection amount Q'p which was obtained in step 106, and the corresponding target injection period Qt (N, Q'p) data is transferred into the CPU 11.

Figure 15:
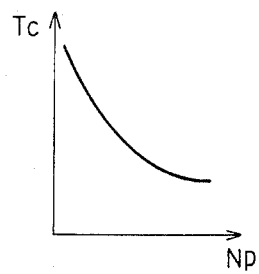

Then, in step 108, a time Tc for closing the overflow port 7 of the injection pump 1 is calculated. This step is a preparatory step adopted so that by closing the solenoid valve in advance the fuel may be injected from the pump chamber 5 upon starting of the following pressure stroke of the plunger 2. The time to be calculated may be any time if only it is during the suction stroke of the plunger 2. More specifically, the time Tc is proportional to the reciprocal of the number of revolutions of the pump. For example, it may be calculated from such a map as shown in FIG. 15 or from a calculation formula (for example, $$Tc = \frac{60}{8 \times Np}$$

seconds if the pump is a 4-cylinder distributor pump). Then, in step 109, whether the key switch 27 has been turned off or not is judged, and if the result of judgement is "NO", the above step 104 is again executed. Subsequently, until the judgment result in step 109 becomes "YES", the steps 104, 105, 106, 107, and 108 are executed repeatedly.

Figure 12:
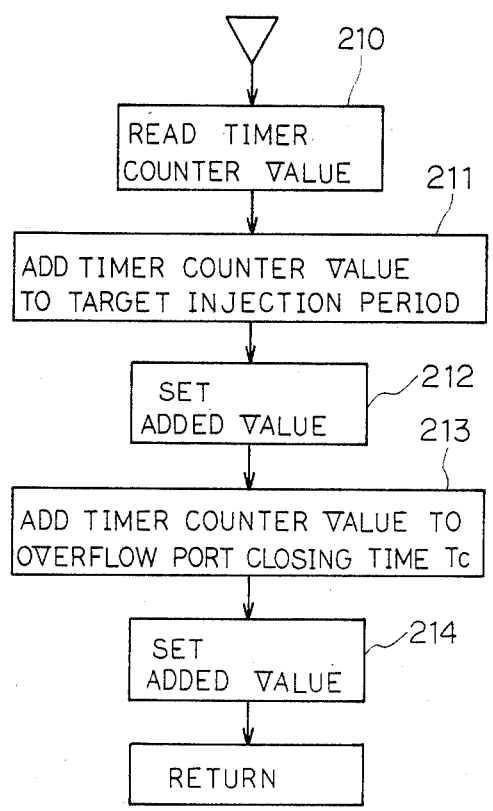
Figure 13:
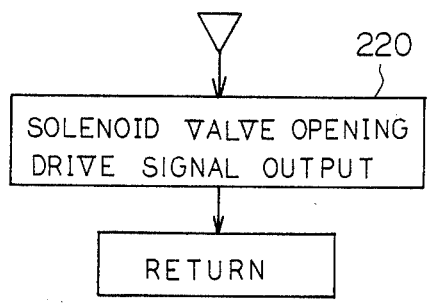
Figure 14:
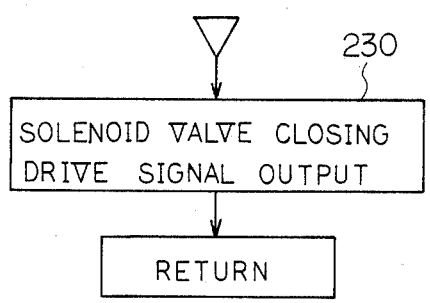

During repetition of the above processings, if such an injection start signal pulse as shown in FIG. 6(b) is produced and the CPU 11 detects the leading edge of the pulse (that is, upon injection of fuel from the nozzle 30 to the diesel engine 20), the program transfers to the injection start interruption routine shown in FIG. 12.

In the injection start interruption routine, first in step 210, the timer counter value contained in the CPU 11 at that time point is read. Then, in step 211, the timer counter value and the target injection period Qt obtained in the foregoing step 107 are added. In step 212, the added value is set as a solenoid valve opening drive output interruption time indicative of injection end. Further, in step 213, the count value read in step 210 and the overflow port closing time Tc calculated in step 108 are added. Then, in step 214, this added value is set as a solenoid valve closing drive output interruption time for closing the overflow port 7, and then the program returns to the main routine to resume the normal operation. When the timer counter value coincides with the solenoid valve opening drive output interruption time set in step 212, the program transfers to the injection end output interruption routine shown in FIG. 13. In step 220, a solenoid valve opening drive signal is produced and the CPU 11 produces a signal for deenergizing the solenoid valve 8, whereby the solenoid valve 8 is deenergized and the fuel injection through the nozzle 30 is discontinued. And the program again returns to the main routine. Further, when the timer counter value coincides with the solenoid valve closing drive output interruption time set in step 214, the program transfers to the overflow port closing output interruption routine shown in FIG. 14. In step 230, a solenoid valve closing drive signal is produced to close the overflow port 7 to thereby prepare for the next fuel injection. And the program again returns to the main routine. Thereafter, when the key switch 27 is turned off, a solenoid valve opening drive signal is produced (the solenoid valve 8 is deenergized) for communication of the pump chamber 5 with the low-pressure chamber 70 as shown in FIG. 1 so that the injection amount may become zero in step 110.

Figure 16:
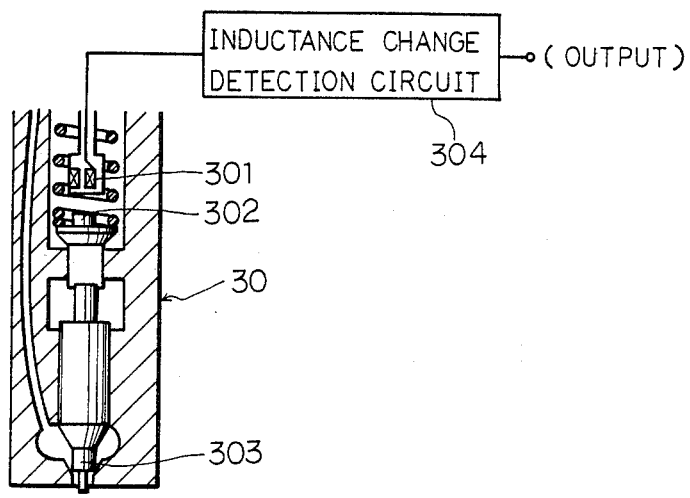
FIG. 16 is a sectional view showing a nozzle lift detector as another embodiment of an injection start detector.
Figure 17:
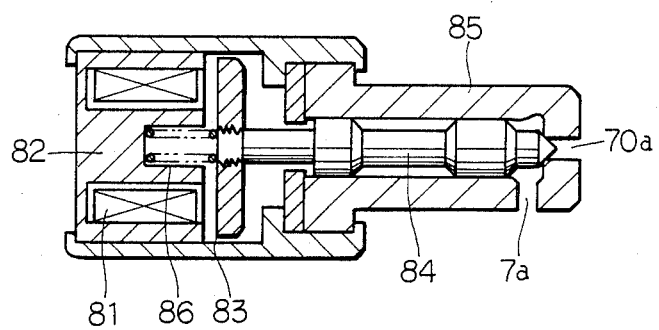
FIG. 17 is a sectional view showing another embodiment of a solenoid valve.

Other embodiment are as follows. (1) As the injection start detector there may be used a nozzle valve lift detector as shown in FIG. 16. In this nozzle valve lift detector, a magnetic material 302 is disposed on a nozzle valve 303 in the fuel injection nozzle 30, and a coil 301 is disposed in an opposed relation to the magnetic material 302. When fuel is injected from the injection pump 1 and the nozzle valve 303 is lifted, the magnetic material 302 approaches the coil 301, so that the inductance of the coil 301 changes. If this change in inductance is detected by utilizing an inductance change detection circuit 304 of a known configuration, it is possible to detect the time point when the fuel was injected.

(2) Although a distributor type fuel injection pump has been controlled in the foregoing embodiment, and in-line fuel injection pump can also be controlled in the same way.

(3) Although in the foregoing embodiment the overflow passage comes into communication with the low pressure side upon deenergization of the solenoid valve, the control apparatus may be constructed to that an overflow occurs when the solenoid valve is energized.

What is claimed is:

1. A fuel injection control apparatus for a diesel engine having a fuel injection pump with a fuel pressurizing chamber for injecting fuel into the engine through an injection nozzle connected with said fuel injection pump, comprising:

an overflow passage having a first end in communication with said fuel pressurizing chamber and a second end to communicate with a low pressure side of said pump;

a solenoid valve, disposed in said overflow passage between said first and second ends for controlling flow of fuel through said overflow passage;

an injection start detector for detecting, based on fuel pressure, an actual start time of fuel injection to the diesel engine and providing an injection start signal indicative thereof;

operating condition detector means for detecting at least one operating condition of said engine and providing an operating condition electric signal indicative thereof; and a control circuit for controlling, responsive to said operating condition electric signal and said injection start signal, the opening and closing of said solenoid valve, said control circuit including:

means response to said operating condition electric signal, for calculating a target injection amount of fuel for injecting into said engine in a single injection;

means for calculating a target injection period of time corresponding to said target injection amount said target injection period extending from the time of said injection start signal to the opening of said overflow passage by said solenoid valve; and means for driving said solenoid valve to open said overflow passage when said target injection period has elapsed from the time of said injection start signal.

2. A fuel injection control apparatus according to claim 1, wherein said target injection period calculating means includes a two-dimensional map having pre-stored data of a plurality of target injection periods organized by the number of revolutions of said engine per unit time and said target injection amount.

3. A fuel injection control apparatus according to claim 1, wherein said solenoid valve driving means includes: means for storing the time of said injection start signal, means for adding said target injection period to said injection start signal time to determine an opening time of said overflow passage, and means for opening said solenoid valve when said opening time is reached.

4. A fuel injection control apparatus according to claim 1, wherein said injection start detector comprises an injection pressure sensor which detects an actual pressure of injected fuel exceeding a preset value.

5. A fuel injection control apparatus according to claim 1, wherein said injection start detector comprises a nozzle lift detector which detects a lifting of said injection nozzle of said engine.

* * * * *